United States Patent
Ha et al.

(10) Patent No.: US 12,183,030 B2
(45) Date of Patent: Dec. 31, 2024

(54) APPARATUS AND METHOD FOR PROCESSING AN IMAGE OF A VEHICLE

(71) Applicants: HYUNDAI MOTOR COMPANY, Seoul (KR); KIA CORPORATION, Seoul (KR)

(72) Inventors: Kyung Soo Ha, Hwaseong-si (KR); In Mook Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 183 days.

(21) Appl. No.: 17/940,627

(22) Filed: Sep. 8, 2022

(65) Prior Publication Data

US 2023/0169678 A1 Jun. 1, 2023

(30) Foreign Application Priority Data

Dec. 1, 2021 (KR) .................. 10-2021-0170270

(51) Int. Cl.
| | |
|---|---|
| *G06T 7/73* | (2017.01) |
| *B60R 1/27* | (2022.01) |
| *G06T 7/13* | (2017.01) |
| *G06T 7/90* | (2017.01) |
| *G06V 20/56* | (2022.01) |
| *H04N 23/76* | (2023.01) |
| *H04N 23/90* | (2023.01) |

(52) U.S. Cl.
CPC .................. *G06T 7/73* (2017.01); *B60R 1/27* (2022.01); *G06T 7/13* (2017.01); *G06T 7/90* (2017.01); *G06V 20/56* (2022.01); *H04N 23/76* (2023.01); *H04N 23/90* (2023.01); *B60R 2300/105* (2013.01); *B60R 2300/20* (2013.01); *B60R 2300/30* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 2010/0254595 A1* | 10/2010 | Miyamoto | ................ G06T 7/11 382/192 |
| 2015/0066310 A1* | 3/2015 | Kim | .......................... G05D 3/10 701/49 |
| 2017/0013188 A1* | 1/2017 | Kothari | ................... H04N 7/181 |
| 2021/0225023 A1* | 7/2021 | Panakos | .................... G06T 7/70 |

* cited by examiner

*Primary Examiner* — Rebecca A Volentine
(74) *Attorney, Agent, or Firm* — Lempia Summerfield Katz LLC

(57) ABSTRACT

The present disclosure relates to a vehicle image processing device and a method therefor. A vehicle image processing apparatus may include a storage that stores optical property information of a first camera among a plurality of cameras for obtaining a vehicle periphery image, a processor that determines whether backlight is present in the vehicle periphery image and generates a display image based on whether the backlight is present, and a communication device controlled by the processor and communicating with a device in the vehicle. The processor may calculate location information of a light source for at least one of the first camera or the vehicle by using coordinates of a shadow object of the vehicle, which is recognized from the vehicle periphery image, and coordinates of the vehicle, and may determine whether the backlight is present, by comparing location information of the light source with the optical property information.

20 Claims, 14 Drawing Sheets

APPARATUS AND METHOD FOR PROCESSING AN IMAGE OF A VEHICLE

CROSS-REFERENCE TO RELATED APPLICATION

This application claims the benefit of priority to Korean Patent Application No. 10-2021-0170270, filed in the Korean Intellectual Property Office on Dec. 1, 2021, the entire contents of which are incorporated herein by reference.

TECHNICAL FIELD

The present disclosure relates to a vehicle image processing device and a method therefor, and more particularly, relates to a vehicle image processing device capable of generating an image without distortion caused by a backlight source, a system including the same, and a method thereof.

BACKGROUND

As the supply of vehicles increases, traffic accidents are causing social/economic damage. Accordingly, to prevent traffic accidents and to minimize damages, research on an intelligent vehicle system from grafting advanced information and communication technologies onto a vehicle is being actively conducted.

To increase a driver's field of view, a vehicle system may provide images related to an area, in which it is difficult for a driver to identify risks with eyes, by using a plurality of cameras. However, depending on an environment (e.g., when a shooting direction of a camera corresponds to backlight) around a vehicle, distortion may occur in an image captured by the camera. Due to the image distortion, it may be difficult for the driver to properly perceive information (e.g., an obstacle or a distance) about the environment around the vehicle.

SUMMARY

The present disclosure has been made to solve the above-mentioned problems occurring in the prior art while advantages achieved by the prior art are maintained intact.

An aspect of the present disclosure provides a vehicle image processing device capable of immediately determining whether there is backlight for each camera through shadow recognition of a vehicle, and a method therefor.

The technical problems to be solved by the present disclosure are not limited to the aforementioned problems, and any other technical problems not mentioned herein should be clearly understood from the following description by those having ordinary skill in the art to which the present disclosure pertains.

According to an aspect of the present disclosure, a vehicle image processing apparatus may include a storage that stores optical property information of a first camera among a plurality of cameras for obtaining a vehicle periphery image, a processor that determines whether backlight is present in the vehicle periphery image and generates a display image based on whether the backlight is present, and a communication device controlled by the processor and communicating with a device in the vehicle.

In an embodiment, the processor may calculate location information of a light source for at least one of the first camera or the vehicle by using coordinates of a shadow object of the vehicle, which is recognized from the vehicle periphery image, and coordinates of the vehicle. The processor may also determine whether the backlight is present, by comparing location information of the light source with the optical property information.

In an embodiment, the location information of the light source may include a first altitude corresponding to an altitude of the light source, a first horizontal tilt angle formed between an optical axis of a second camera, which is positioned on a left side with respect to the light source, from among the plurality of cameras and the light source, and a second horizontal tilt angle formed between an optical axis of a third camera, which is positioned on a right side with respect to the light source, from among the plurality of cameras and the light source.

In an embodiment, the optical property information may include a second altitude corresponding to a shooting range (i.e., camera shooting range) in an upward direction of the first camera with respect to an optical axis of the first camera, a third horizontal tilt angle corresponding to a shooting range in a left direction of the first camera with respect to the optical axis of the first camera, and a fourth horizontal tilt angle corresponding to a shooting range in a right direction of the first camera with respect to the optical axis of the first camera.

In an embodiment, the processor may determine whether the backlight is present, by using at least one comparison result of a first comparison result of comparing the first altitude and the second altitude, a second comparison result of comparing the first horizontal tilt angle and the third horizontal tilt angle, or a third comparison result of comparing the second horizontal tilt angle and the fourth horizontal tilt angle.

In an embodiment, the processor may determine that the backlight is present, when at least one of a first backlight existence condition that the first altitude is not greater than the second altitude, a second backlight existence condition that the first horizontal tilt angle is not less than the third horizontal tilt angle, or a third backlight existence condition that the second horizontal tilt angle is not greater than the fourth horizontal tilt angle is satisfied.

In an embodiment, the first altitude may correspond to an angle formed between a ground surface and an edge line of sight connecting a first edge point of the shadow object to a second edge point of the vehicle adjacent to the first edge point. The first horizontal tilt angle may be an angle between a first optical axis of the second camera, which is positioned on one side with respect to the second edge point, from among the plurality of cameras and a reference line obtained by projecting the edge line of sight onto the ground surface. The second horizontal tilt angle may be an angle between a second optical axis of the third camera, which is positioned on the other side with respect to the second edge point, from among the plurality of cameras and the reference line obtained by projecting the edge line of sight onto the ground surface.

In an embodiment, the second altitude may correspond to an angle formed between an optical axis of the first camera facing a center part of a two-dimensional (2D) image view, which is captured through the first camera among the plurality of cameras, and a first line of sight connecting between a top pixel of the 2D image view and the first camera. The third horizontal tilt angle may be an angle formed between the optical axis of the first camera and a second line of sight connecting a leftmost pixel of the 2D image view to the camera. The fourth horizontal tilt angle may be an angle formed between the optical axis of the first camera and a third line of sight connecting a rightmost pixel of the 2D image view to the first camera.

In an embodiment, the processor may select a camera, which is positioned on an opposite side of the shadow object with respect to the vehicle, from among the plurality of cameras as a backlight determination camera and may compare optical property information of the backlight determination camera with the location information of the light source.

In an embodiment, the processor may determine consistency of the location information of the light source based on whether an outermost line of the shadow object matches a skin surface line of the vehicle.

In an embodiment, the processor may determine whether a light bleed area is present in the vehicle periphery image in which the backlight is present, when it is determined that the backlight is present, and may generate the display image excluding the light bleed area in the vehicle periphery image when it is determined that the light bleed area is present.

In an embodiment, the processor may determine whether the light bleed area is present, by determining continuity of pixels having a predetermined color value from a location of a light source object generating the backlight.

According to an aspect of the present disclosure, a vehicle image processing method may include extracting coordinates of a shadow object of a vehicle based on information recognized from a vehicle periphery image obtained by using a plurality of cameras, calculating optical property information for a first camera of the plurality of cameras, calculating location information of a light source for at least one of the first camera or the vehicle by using coordinates of the shadow object and coordinates of the vehicle, and determining whether backlight is present in the vehicle periphery image, by comparing the optical property information and the location information of the light source.

BRIEF DESCRIPTION OF THE DRAWINGS

The above and other objects, features and advantages of the present disclosure should be more apparent from the following detailed description taken in conjunction with the accompanying drawings.

DETAILED DESCRIPTION

Figure 1:
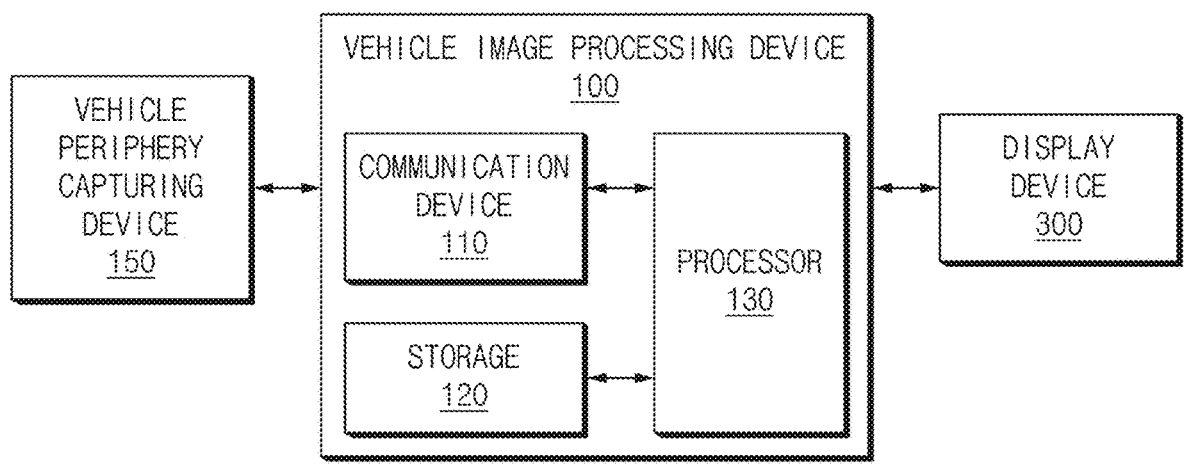
FIG. 1 is a block diagram illustrating a configuration of a vehicle system including a vehicle image processing device, according to an embodiment of the present disclosure.

Hereinafter, some embodiments of the present disclosure are described in detail with reference to the accompanying drawings. In adding reference numerals to components of each drawing, it should be noted that the same components have the same reference numerals, although they are indicated on another drawing. In describing embodiments of the present disclosure, detailed descriptions associated with well-known functions or configurations are omitted when they may make subject matters of the present disclosure unnecessarily obscure.

In describing components of embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It is understood that terms used herein should be interpreted as having a meaning that is consistent with their meaning in the context of the present disclosure and the relevant art and should not be interpreted in an idealized or overly formal sense unless expressly so defined herein.

Hereinafter, embodiments of the present disclosure are described in detail with reference to FIGS. 1 to 10.

FIG. 1 is a block diagram illustrating a configuration of a vehicle system including a vehicle image processing device, according to an embodiment of the present disclosure.

Referring to FIG. 1, according to an embodiment of the present disclosure, a vehicle system may include a vehicle image processing device 100, a vehicle periphery capturing device 150, and a display device 300. At least one of the vehicle image processing device 100, the vehicle periphery capturing device 150, and the display device 300 illustrated in FIG. 1 may be included in at least one of a parking system of a vehicle and a driving system of the vehicle.

The vehicle periphery capturing device 150 recognizes shadows, obstacles, and parking lines from an image around the vehicle, which is obtained by capturing the surroundings of the vehicle and provides the recognized result to the vehicle image processing device 100. To this end, the vehicle periphery capturing device 150 may be implemented as a surround view monitor (SVM) device and may be equipped with wide-angle cameras on the front, rear, left, and right sides of the vehicle to capture the entire periphery of the vehicle. Moreover, to detect nearby obstacles (an obstacle location, an obstacle relative distance, an obstacle relative speed, or the like), the vehicle periphery capturing device 150 may include an ultrasonic sensor, radar, a camera, a laser scanner and/or corner radar, LiDAR, an acceleration sensor, a yaw rate sensor, a torque measuring sensor and/or wheel speed sensor, a steering angle sensor, and the like.

The display device 300 may display a display image processed by the vehicle image processing device 100. The display image may be a parking information image and/or driving information image of a vehicle. The display device 300 is installed in a vehicle and may be implemented with a liquid crystal display, a transparent display, an LED display, a flexible display, a head up display, or the like.

The vehicle image processing device 100 may determine whether there is a light bleed area by a backlight source, based on information recognized from images around the vehicle and may generate a display image (e.g., a parking information image), which does not have the light bleed area, depending on the determination result.

The vehicle image processing device 100 may include a communication device 110, storage 120, and a processor 130.

The communication device 110 may be a hardware device implemented with various electronic circuits for transmitting and receiving signals via a wireless or wired connection. In the present disclosure, the communication device 110 may perform communication in a vehicle through CAN communication, LIN communication, Ethernet communication, or the like. For example, the communication device 110 may communicate with the vehicle periphery capturing device 150 and the display device 300.

The storage 120 may store image data received from the vehicle periphery capturing device 150 and image data-based recognition information. The storage 120 may store parking space information, automatic parking route information, and parking information images, which are obtained by the processor 130. The storage 120 may include at least one type of a storage medium among a flash memory type of a memory, a hard disk type of a memory, a micro type of a memory, or a card type (e.g., a Secure Digital (SD) card or an eXtream Digital (XD) card) of a memory, a random access memory (RAM) type of a memory, a static RAM (SRAM) type of a memory, a read-only memory (ROM) type of a memory, a programmable ROM (PROM) type of a memory, an electrically erasable PROM (EEPROM) type of a memory, a magnetic RAM (MRAM) type of a memory, a magnetic disc type of a memory, or an optical disc type of a memory.

Figure 2:
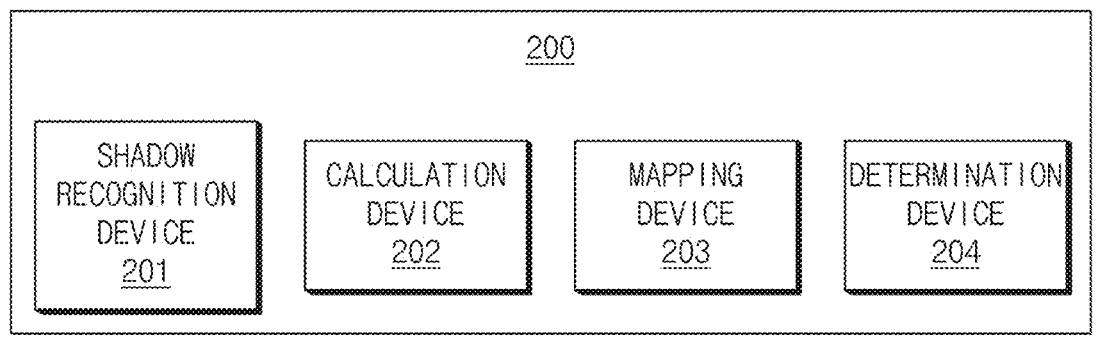
FIG. 2 is a block diagram illustrating a software module executed by a processor, according to an embodiment of the present disclosure.

The storage 120 may store at least one software module. For example, the software module stored in the storage 120 may include various software components for determining backlight and generating a display image without a light bleed area. For example, as shown in FIG. 2, the storage 120 may store a software module 200 including a shadow recognition device 201, a calculation device 202, a mapping device 203, and a determination device 204. The shadow recognition device 201, the calculation device 202, the mapping device 203, and the determination device 204 are described below with reference to FIG. 3.

The processor 130 may be electrically connected to the communication device 110, the storage 120, the display device 300, and the vehicle periphery capturing device 150, may electrically control each of the components, may be an electrical circuit that executes instructions of the software, and may perform various data processing and calculation described below.

Figure 3:
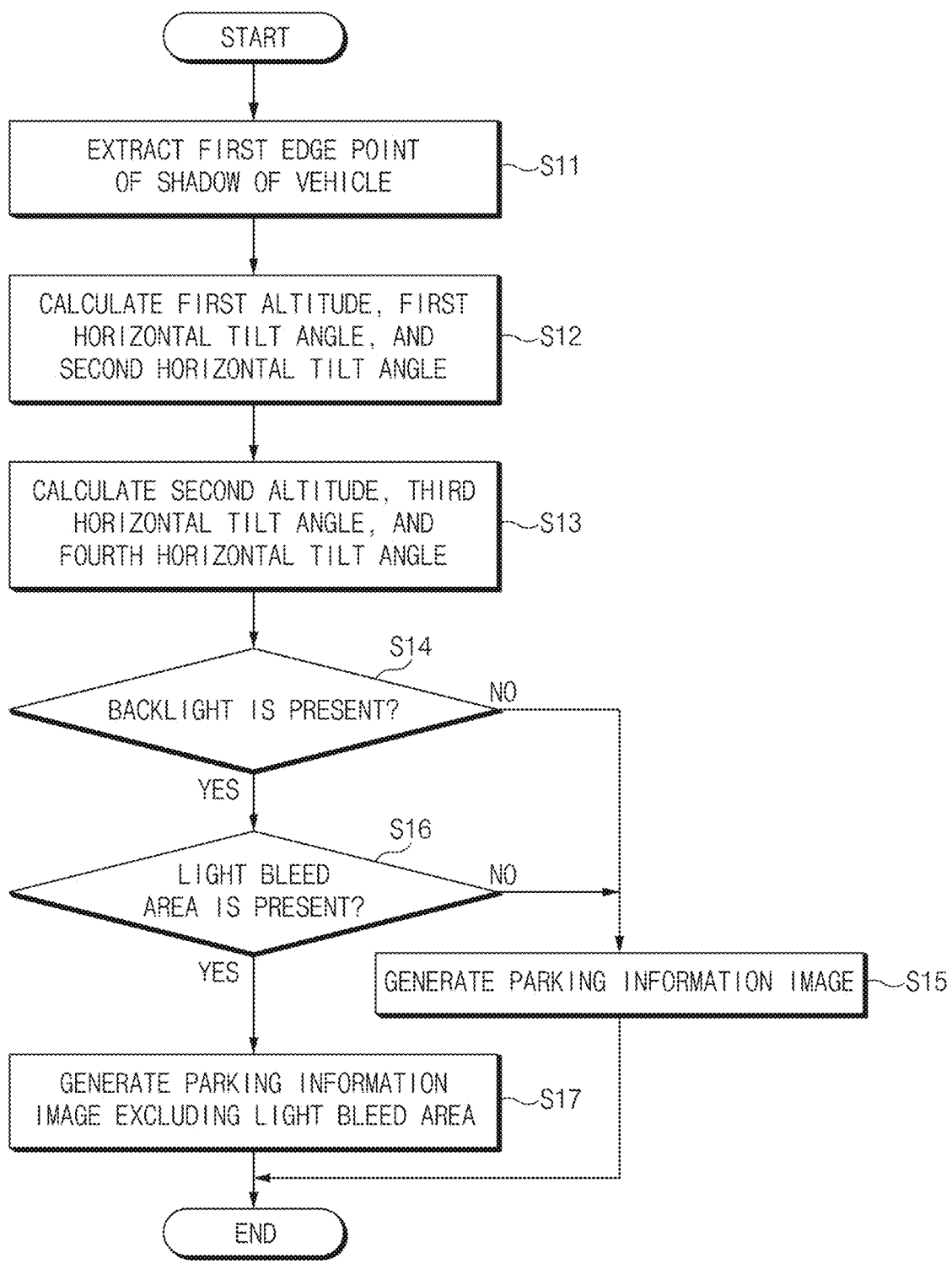
FIG. 3 is a flowchart illustrating a method of generating a parking information image of a vehicle image processing device, according to an embodiment of the present disclosure.

Hereinafter, an image processing method of a vehicle according to an embodiment of the present disclosure is described in detail with reference to FIGS. 2 to 7B. FIG. 3 is a flowchart illustrating an image processing method of a vehicle, according to an embodiment of the present disclosure.

Hereinafter, it is assumed that the vehicle image processing device 100 of FIG. 1 including the software module 200 of FIG. 2 performs a process of FIG. 3. In addition, in a description of FIG. 3, it may be understood that an operation described as being performed by a device is controlled by the processor 130 of the vehicle image processing device 100.

Referring to FIGS. 2 to 7B, the shadow recognition device 201 of the vehicle image processing device 100 may extract a first edge point of a shadow object of the recognized vehicle from an image around a vehicle, which is captured by the vehicle periphery capturing device 150 (operation S11). As shown in FIG. 4A, the vehicle periphery capturing device 150 may include a plurality of cameras 111, 112, 113, and 114 mounted on the vehicle. The vehicle periphery capturing device 150 may include the first to fourth cameras 111, 112, 113, and 114. The first camera 111 may be mounted on a front of the vehicle to capture the front of the vehicle. The second camera 112 may be mounted on a left side of the vehicle to capture the left side of the vehicle. The third camera 113 may be mounted on a right side of the vehicle to capture the right side of the vehicle. The fourth camera 114 may be mounted on a rear of the vehicle to capture the rear of the vehicle. The vehicle periphery capturing device 150 may obtain at least one image around a vehicle, which is captured through at least one of the plurality of cameras. A plurality of images around the vehicle may be converted into a top-view image viewed from above the vehicle, by being synthesized. The image around the vehicle may include a vehicle object and a shadow object. The shadow object may correspond to the vehicle's own shadow formed around the vehicle by light emitted from the sun or a light source including lighting around the vehicle.

Figure 4A:
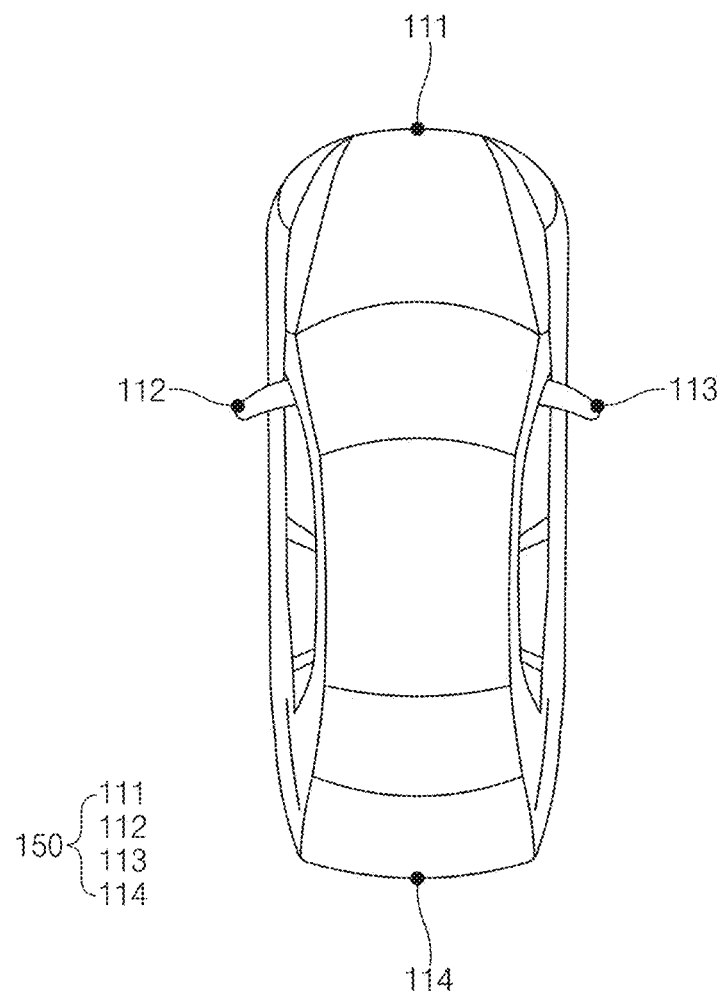
FIG. 4A is a diagram for describing locations of a plurality of cameras included in a vehicle periphery capturing device, according to an embodiment of the present disclosure.
Figure 4B:
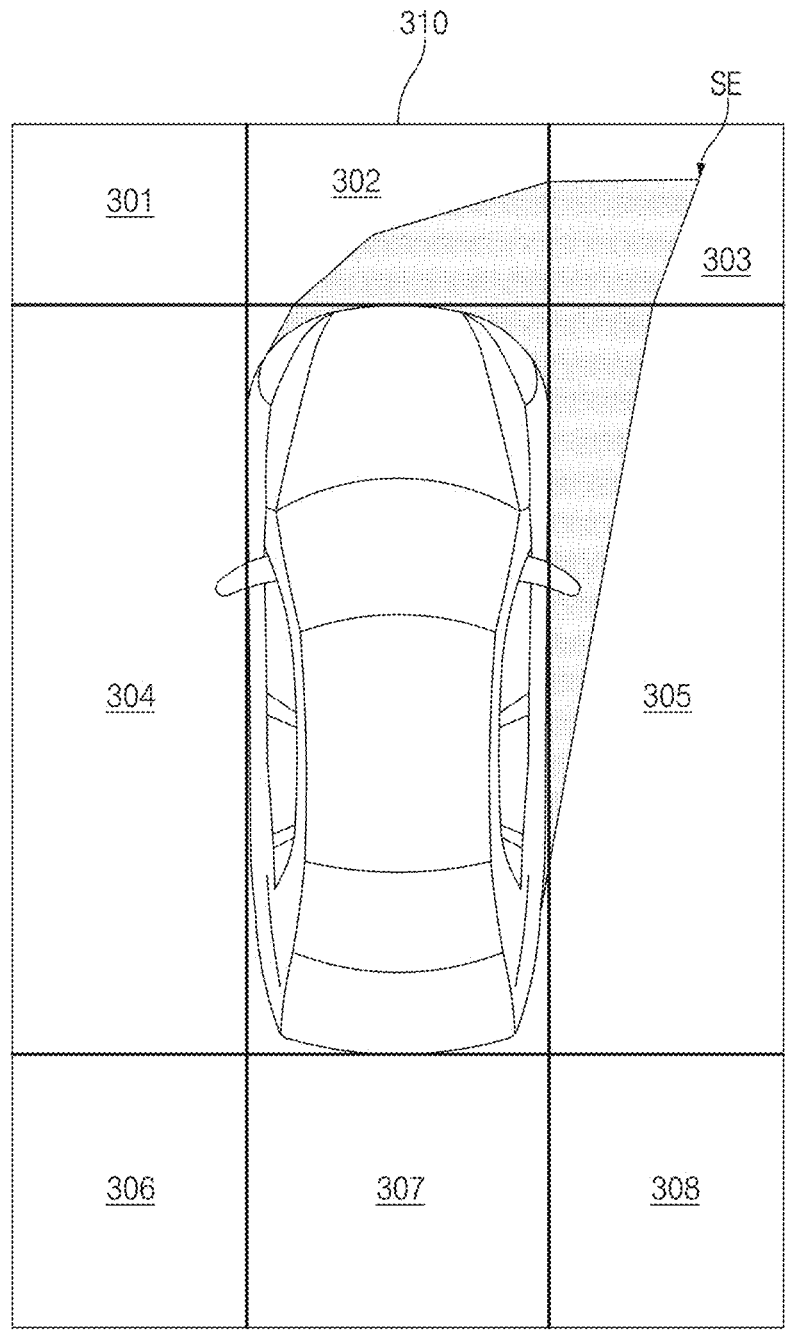
FIG. 4B is a diagram for describing a shadow recognition area formed around a vehicle, according to an embodiment of the present disclosure.

As shown in FIG. 4B, the shadow recognition device 201 may extract a first edge point SE of the shadow object included in an image 410 around the vehicle. In an image obtained through the vehicle periphery capturing device 150, the shadow recognition device 201 may recognize, as a shadow object, an area darker than a background area while being in contact with a vehicle object among the background area other than the vehicle object. The shadow recognition device 201 may set a point of the shadow object, which is positioned farthest from a point (e.g., the center point of the vehicle object) of the vehicle object, as the first edge point SE of the shadow object.

The shadow recognition device 201 may select a backlight determination camera based on an area where the first edge point SE of the shadow object is recognized. Because a light source is located on the opposite side of the first edge point SE of the shadow object with respect to the vehicle, a camera that captures the opposite side of the first edge point SE with respect to the vehicle may be selected as a backlight determination camera. The backlight determination camera captures the vehicle's surrounding environment in an environment in which the shooting direction of the camera corresponds to a backlight source, and thus the backlight determination camera may obtain an image including a light source object or backlight. For example, as shown in FIG.

4B and Table 1, when the shadow edge point SE is detected in a third area 303, the light source may be positioned on the opposite side of the first edge point SE of the shadow object with respect to the vehicle. The second camera 112 and the fourth camera 114 that capture the opposite side of the first edge point SE may be selected as backlight determination cameras.

TABLE 1

| Shadow edge point detecting area | Backlight-determining camera |
|---|---|
| First area 301 | Third and fourth cameras 113 and 114 |
| Second area 302 | Fourth camera 114 |
| Third area 303 | Second and fourth cameras 112 and 114 |
| Fourth area 304 | Third camera 113 |
| Fifth area 305 | Second camera 112 |
| Sixth area 306 | First and third cameras 111 and 113 |
| Seventh area 307 | First camera 111 |
| Eighth area 308 | First and second cameras 111 and 112 |

Figure 5A:
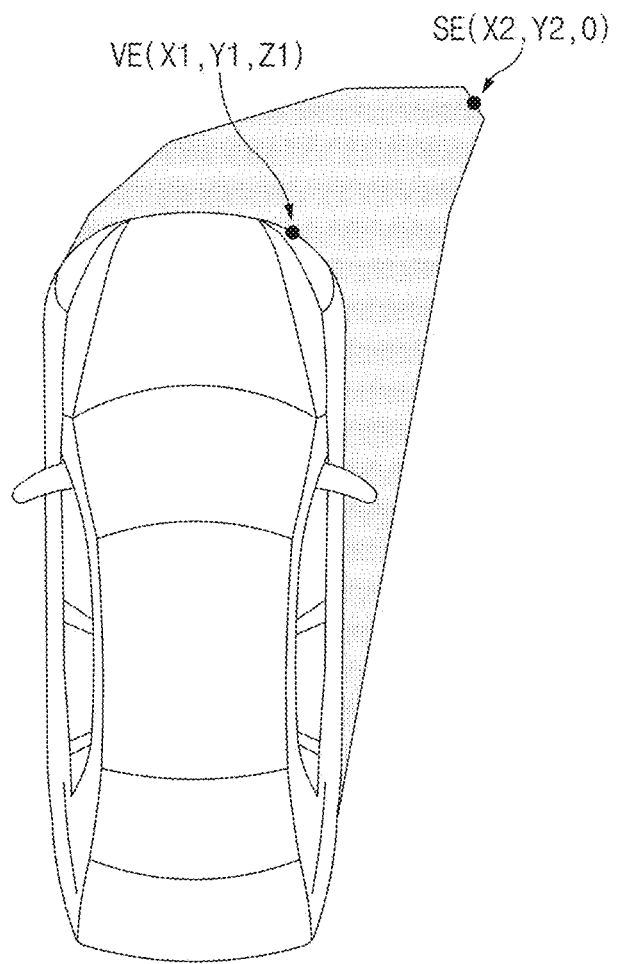
FIG. 5A is a diagram illustrating an example of a first edge point of a shadow extracted through image recognition and a second edge point of a vehicle, according to an embodiment of the present disclosure.

The calculation device 202 of the vehicle image processing device 100 may calculate location information of a light source for at least one of a camera and a vehicle by using coordinates of the first edge point SE of the shadow object and coordinates of a second edge point VE of the vehicle (operation S12). As shown in FIG. 5A, the second edge point VE of the vehicle may be a point of the vehicle exposed to a light source while being positioned closest to the first edge point SE of the shadow object. The first edge point SE may be the shadow of the second edge point VE of the vehicle. Three-dimensional (3D) coordinates (X2, Y2, 0) of the first edge point SE of a shadow object located on a ground surface may be located lower than 3D coordinates (X1, Y1, Z1) of the second edge point VE of the vehicle positioned above the ground surface. The second edge point VE of the vehicle may be specification information of the vehicle and may be stored in the storage 120 in advance. In addition to the second edge point VE of the vehicle, the specification information of the vehicle may include the vehicle's overall length, overall width, overall height, inter-wheel distance, minimum ground clearance, inter-side distance, and the like.

Figure 5B:
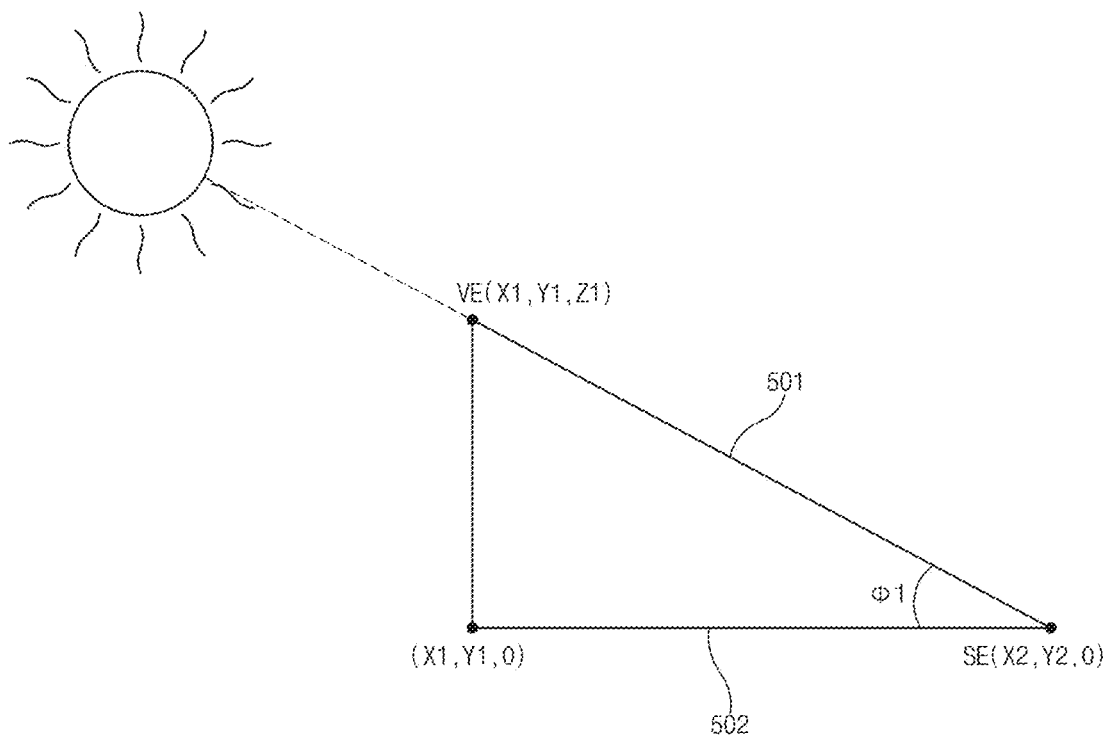
FIG. 5B is a diagram illustrating a method of calculating a first altitude, according to an embodiment of the present disclosure.
Figure 5C:
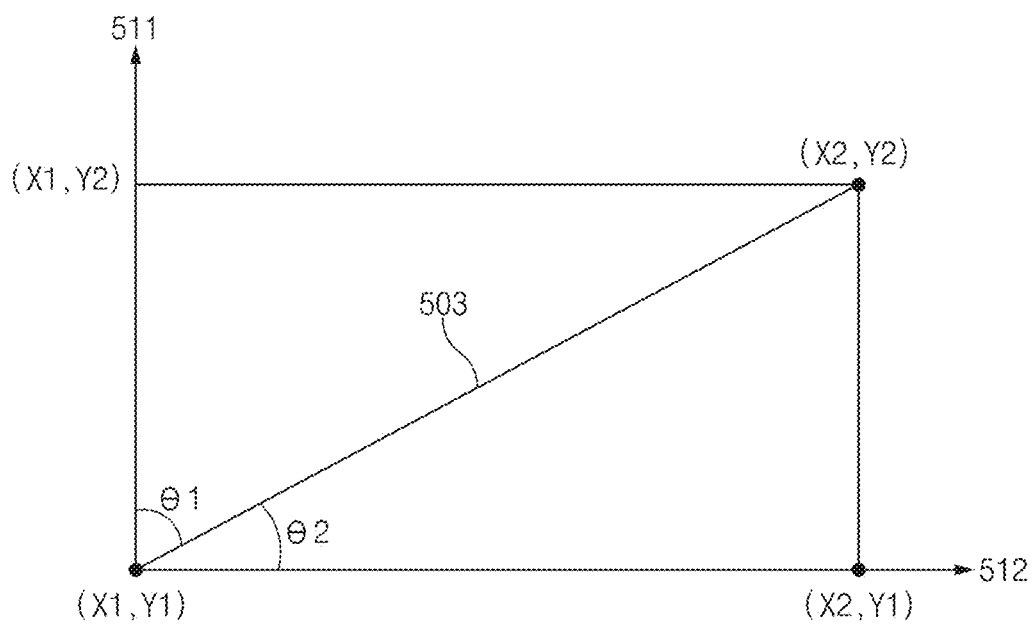
FIG. 5C is a diagram illustrating a method of calculating a first horizontal tilt angle and a second horizontal tilt angle, according to an embodiment of the present disclosure.

The calculation device 202 may calculate a first altitude $\phi 1$ corresponding to the relative location information of a light source to a vehicle, and a first horizontal tilt angle $\theta 1$ and a second horizontal tilt angle $\theta 2$ corresponding to relative location information of a light source to a camera (operation S12). As shown in FIG. 5B, the first altitude $\phi 12$ may correspond to an angle formed between an edge line of sight 501, which connects the first edge point SE of the shadow object and the second edge point VE of the vehicle, and a ground surface 502. As shown in FIG. 5C, the first horizontal tilt angle $\theta 1$ may be an angle inclined to a first optical axis 511 of a camera (e.g., the first camera 111) positioned on one side of the second edge point VE of the vehicle from a reference line 503 obtained by vertically projecting the edge line of sight 501 onto the ground surface 502. As shown in FIG. 5C, the second horizontal tilt angle $\theta 2$ may be an angle inclined to a second optical axis 512 of a camera (e.g., the third camera 113) positioned on the other side of the second edge point VE of the vehicle from the reference line 503 obtained by vertically projecting the edge line of sight 501 onto the ground surface 502.

The mapping device 203 of the vehicle image processing device 100 may calculate optical property information of at least one of a plurality of cameras included in the vehicle periphery capturing device 150 (operation S13). In other words, the mapping device 203 may convert an image around the vehicle, which is captured by each of the plurality of cameras, into a 2D image view according to horizontal and vertical fields of view and may calculate optical property information of each of a plurality of cameras in real time by using the converted 2D image view (operation S13). The calculated optical property information may be stored in the storage 120. As another example, optical property information for each camera may be stored in advance in the storage 120 before a vehicle is shipped. For example, the optical property information may include a second altitude $\phi 2$, a third horizontal tilt angle $\theta 3$, and a fourth horizontal tilt angle $\theta 4$.

Figure 6:
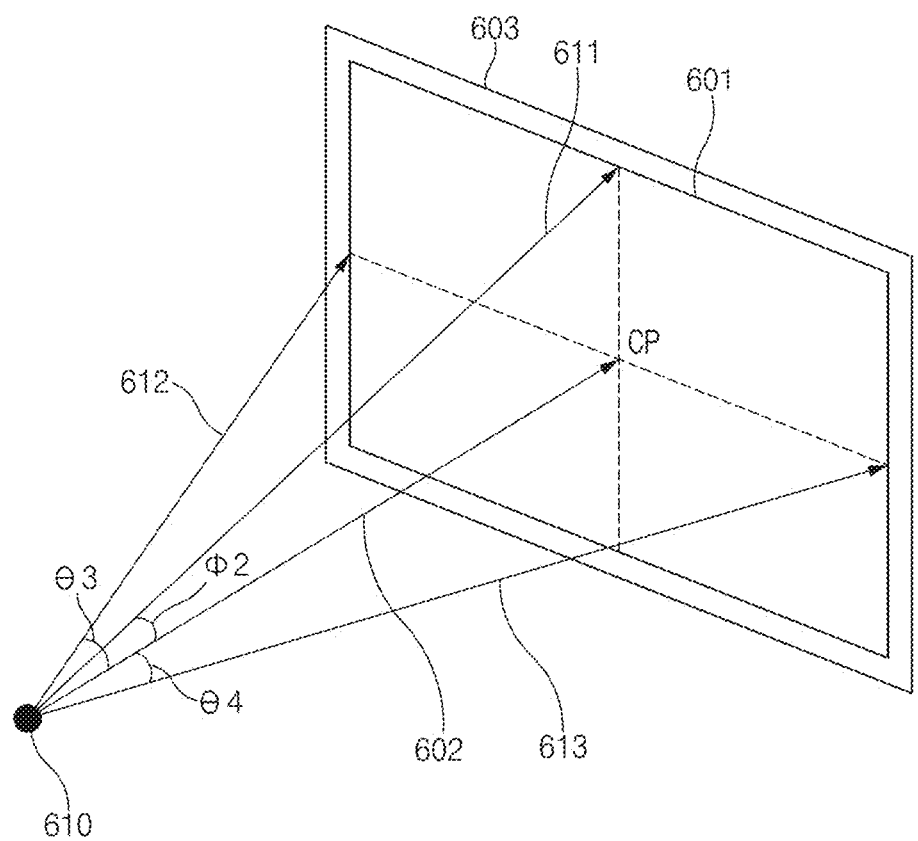
FIG. 6 is a diagram illustrating a method of calculating a second altitude, a third horizontal tilt angle, and a fourth horizontal tilt angle, according to an embodiment of the present disclosure.

As shown in FIG. 6, to calculate the optical property information, at least one camera 610 (e.g., a backlight determination camera) of the plurality of cameras may be installed in front of a measurement screen 603. The at least one camera 610 of the plurality of cameras may convert the captured image into a 2D image view 601 according to horizontal and vertical fields of view. The converted 2D image view 601 may be displayed on the measurement screen 603. In a state where a center part CP of the measurement screen 603 coincides with an optical axis 602 of the camera 610, the second altitude $\phi 2$, the third horizontal tilt angle $\theta 3$, and the fourth horizontal tilt angle $\theta 4$ may be measured by mapping the 2D image view 601 and the camera 610. The second altitude $\phi 2$ may correspond to an angle between a first line of sight 611 connecting the top pixel of the 2D image view to the camera 610 and the optical axis 602 of the camera. The second altitude $\phi 2$ may correspond to a part of a vertical angle of view corresponding to a shooting range in an upward direction of the camera 610 with respect to the optical axis 602 of the camera 610. The third horizontal tilt angle $\theta 3$ may be an angle formed between a second line of sight 612 connecting the leftmost pixel of the 2D image view 601 to the camera 610 and the optical axis 602 of the camera. The third horizontal tilt angle $\theta 3$ may be a part of the horizontal angle of view corresponding to the shooting range in a left direction of the camera 610 with respect to the optical axis 602 of the camera 610. The fourth horizontal tilt angle $\theta 4$ may be an angle between a third line of sight 613 connecting the rightmost pixel of the 2D image view 601 to the camera 610 and the optical axis 602 of the camera. The fourth horizontal tilt angle $\theta 4$ may be the other part of the horizontal angle of view corresponding to the shooting range in a right direction of the camera 610 with respect to the optical axis 602 of the camera 610.

The determination device 204 of the vehicle image processing device 100 may determine whether there is backlight, by comparing location information of a light source calculated by the calculation device 202 with the optical property information of the camera 610 calculated by the mapping device 203 (operation S14). The determination device 204 may compare optical property information of a backlight determination camera among the plurality of cameras with the location information of the light source. The determination device 204 may determine whether a light source corresponding to a backlight source is positioned in an image around the vehicle, based on whether location information of the light source is included in the optical property information of a camera.

The determination device 204 may determine whether the backlight is present, depending on at least one comparison result of a first comparison result of comparing the first altitude φ1 and the second altitude φ2, a second comparison result of comparing the first horizontal tilt angle θ1 and the third horizontal tilt angle θ3, or a third comparison result of comparing the second horizontal tilt angle θ2 and the fourth horizontal tilt angle θ4.

For example, when the first comparison result of comparing the first altitude φ1 and the second altitude φ2 indicates that the first altitude φ1 is not greater than the second altitude φ2, the determination device 204 of the vehicle image processing device 100 may determine that the backlight is present. When the first comparison result of comparing the first altitude φ1 and the second altitude φ2 indicates that the first altitude φ1 exceeds the second altitude φ2, the vehicle image processing device 100 may determine that the backlight is not present.

As another example, when the second comparison result of comparing the first horizontal tilt angle θ1 and the third horizontal tilt angle θ3 indicates that the first horizontal tilt angle θ1 is not less than the third horizontal tilt angle θ3, the determination device 204 of the vehicle image processing device 100 may determine that the backlight is present. When the second comparison result of comparing the first horizontal tilt angle θ1 and the third horizontal tilt angle θ3 indicates that the first horizontal tilt angle θ1 is less than the third horizontal tilt angle θ3, the vehicle image processing device 100 may determine that the backlight is not present.

As another example, when the third comparison result of comparing the second horizontal tilt angle θ2 and the fourth horizontal tilt angle θ4 indicates that the second horizontal tilt angle θ2 is not greater than the fourth horizontal tilt angle θ4, the determination device 204 of the vehicle image processing device 100 may determine that the backlight is present. When the third comparison result of comparing the second horizontal tilt angle θ2 and the fourth horizontal tilt angle θ4 indicates that the second horizontal tilt angle θ2 exceeds the fourth horizontal tilt angle θ4, the vehicle image processing device 100 may determine that the backlight is not present.

As another example, when at least two of the above-described backlight existence condition of the first comparison result, the backlight existence condition of the second comparison result, and the backlight existence condition of the third comparison result are satisfied, the determination device 204 of the vehicle image processing device 100 may determine that the backlight is present.

When the backlight is not present, the vehicle image processing device 100 may generate and output a display image (e.g., a parking information image) obtained by synthesizing a plurality of vehicle periphery images obtained from the vehicle periphery capturing device 150 (operation S15).

Figure 7A:
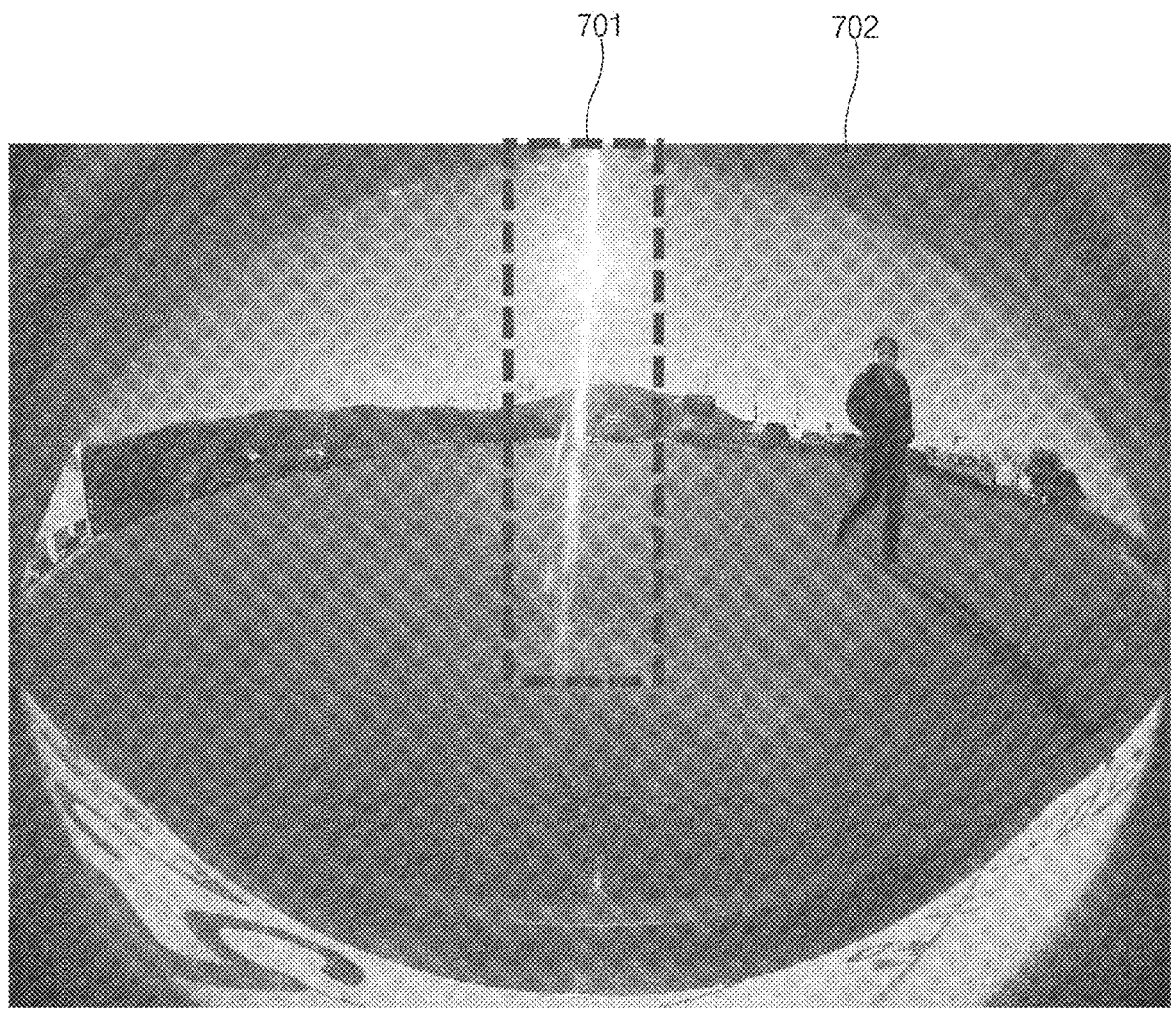
FIG. 7A is a view illustrating an example screen including a light bleed area.

When the backlight is present, as shown in FIG. 7A, the vehicle image processing device 100 may determine whether a light bleed area 701 by a backlight source occurs in a vehicle periphery image 702 where the backlight is present (operation S16). The light bleed area may be extracted by checking the continuity of pixels having a predetermined color value from a location of a light source object corresponding to a backlight source. When the pixels having the predetermined color value are not continuous from the location of the light source object, the vehicle image processing device 100 may determine that a light bleed area is not present. When there is no light bleed area, the vehicle image processing device 100 may generate and output a display image (e.g., a parking information image) obtained by synthesizing a plurality of vehicle periphery images (operation S15).

Figure 7B:
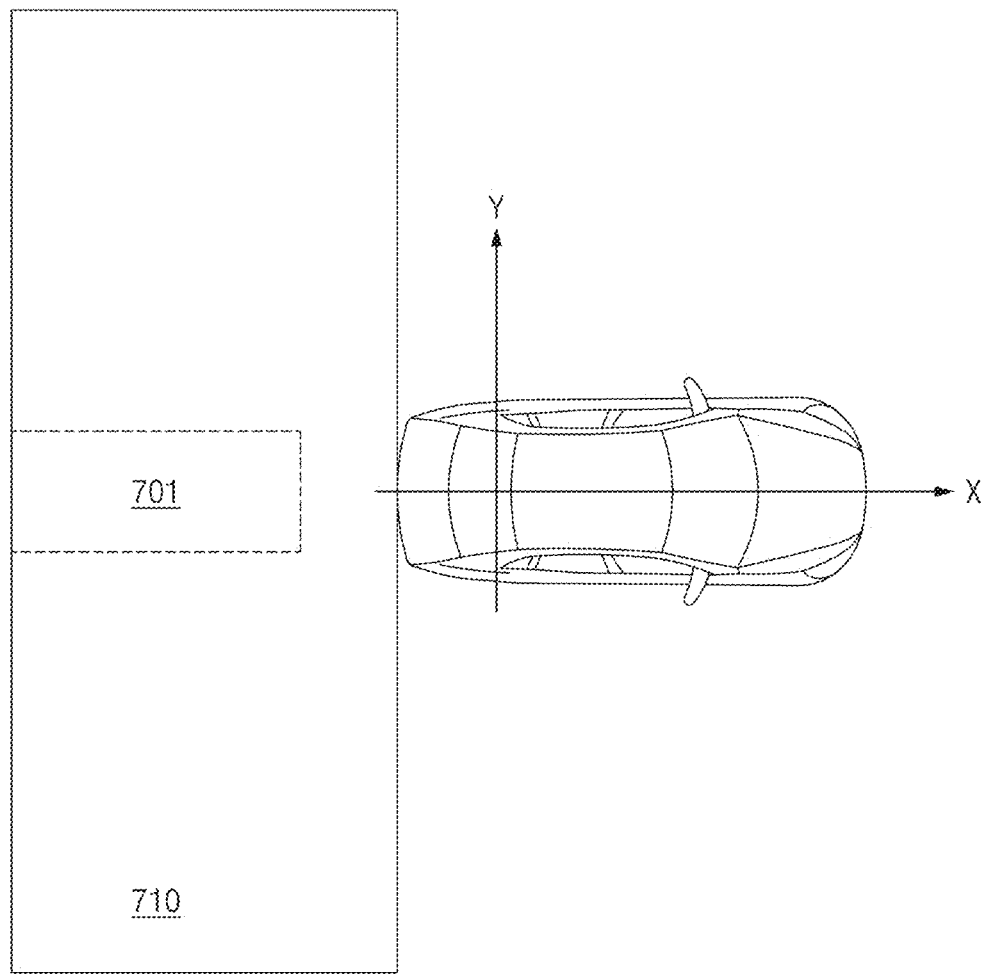
FIG. 7B is a diagram illustrating a parking information image excluding a light bleed area generated by a vehicle image processing device, according to an embodiment of the present disclosure.

As shown in FIG. 7A, when the pixels having the predetermined color value from the location of the light source object are continuous in a row, the vehicle image processing device 100 may determine that the light bleed area 701 is present. As shown in FIG. 7B, the vehicle image processing device 100 may generate a display image 710 excluding the light bleed area 701 by matching the light bleed area by a backlight source with a plurality of vehicle periphery images taken through a plurality of cameras (operation S17). For example, the vehicle image processing device 100 may selectively synthesize the remaining vehicle periphery images other than a vehicle periphery image including the light bleed area 701 from among the plurality of vehicle periphery images and may generate a display image 710. As another example, the vehicle image processing device 100 may correct a vehicle periphery image including the light bleed area 701 among the plurality of vehicle periphery images such that the light bleed area 701 is not recognized. The vehicle image processing device 100 may generate the display image 710 by synthesizing the corrected vehicle periphery image with the remaining vehicle periphery images without the light bleed area 701.

Figure 8:
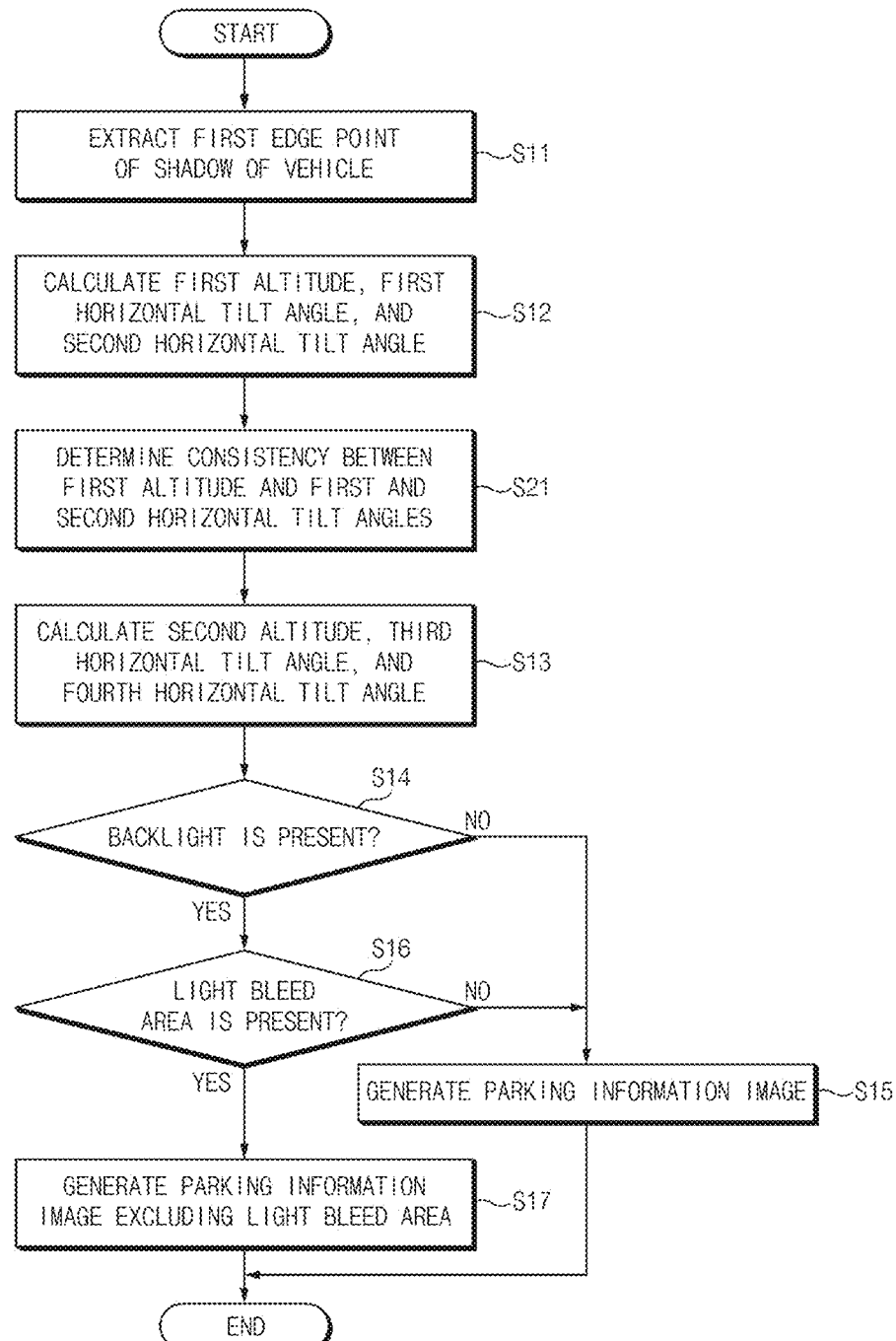
FIG. 8 is a flowchart illustrating a method of generating a parking information image of a vehicle image processing device, according to another embodiment of the present disclosure.
Figure 9:
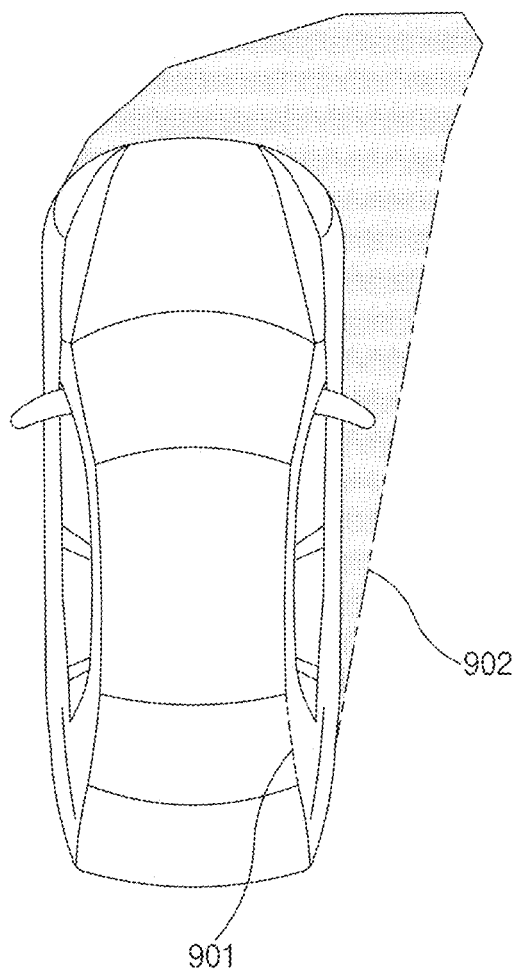
FIG. 9 is a diagram for describing a method of determining consistency of a shadow object, according to another embodiment of the present disclosure.

Hereinafter, according to another embodiment of the present disclosure, a vehicle image processing method is described in detail with reference to FIGS. 8 and 9. FIG. 8 is a flowchart for describing a vehicle image processing method, according to another embodiment of the present disclosure.

Hereinafter, it is assumed that the vehicle image processing device 100 of FIG. 1 performs the process of FIG. 8. In addition, in a description of FIG. 8, it may be understood that an operation described as being performed by a device is controlled by the processor 130 of the vehicle image processing device 100. Moreover, the process of FIG. 8 may operate substantially similarly to the process of FIG. 3 except that operation S21 is further included. Accordingly, descriptions of remaining operations other than operation S21 are omitted to avoid redundancy.

The vehicle image processing device 100 may determine the consistency between light source location information (e.g., a first altitude) of a vehicle and light source location information (e.g., a first horizontal tilt angle and a second horizontal tilt angle) of a camera, which are calculated in operation S12 (operation S21). A vehicle's shadow may be distorted by the vehicle's surrounding environment (a slope, various light sources, or the like). For example, when the vehicle is located on a slope, or an obstacle shadow overlaps a vehicle shadow around the vehicle, distortion may occur in the vehicle shadow. Accordingly, when a skin surface line 901 of the vehicle is projected at the first altitude φ1, the first horizontal tilt angle θ1, and the second horizontal tilt angle θ2, the vehicle image processing device 100 may determine whether the outermost line 902 of a shadow matches the skin surface line 901 of the vehicle corresponding to the outermost line 902. The vehicle's skin surface line 901 may be included in the vehicle's specification information. When it is determined that the outermost line 902 matches the skin surface line 901, the vehicle image processing device 100 may determine that the consistency between the light source location information (e.g., the first altitude φ1) of the vehicle and the light source location information (e.g., the first horizontal tilt angle θ1 and the second horizontal tilt angle θ2) of a camera are present. When it is determined that the matching is present, the vehicle image processing device 100 may perform operation S13. When it is determined that the consistency is not present, the vehicle image processing device 100 performs operations S11 and S12 again. Alternatively, the vehicle image processing device 100 may correct location information of a light source based on the distortion degree of a shadow.

Figure 10:
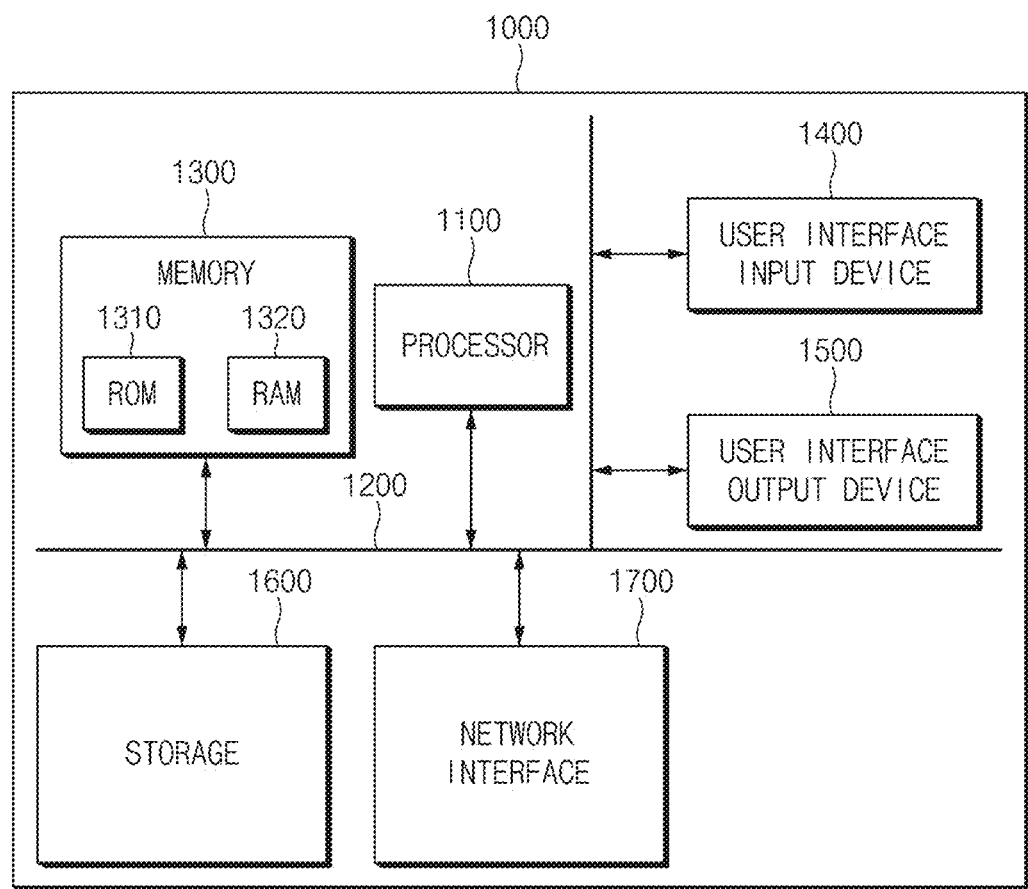
FIG. 10 illustrates a computing system according to an embodiment of the present disclosure.

FIG. 10 illustrates a computing system according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Thus, the operations of the methods or algorithms described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications may be made by one having ordinary skill in the art without departing from the essential characteristic of the present disclosure.

Accordingly, embodiments of the present disclosure are intended not to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an embodiment of the present disclosure, it is possible to detect backlight through shadow recognition without a learning database (DB), and detection time may not be limited.

Additionally, according to an embodiment of the present disclosure, it is possible to reduce a time required to detect backlight as compared to the comparative example in which backlight is determined based on a pattern of an image or a color of a pixel, and it is possible to detect a pattern that has not been learned.

In addition, according to an embodiment of the present disclosure, it is possible to increase the responsiveness to fail safety of a camera caused by backlight and the consistency of recognition area of a parking system.

Further, a variety of effects directly or indirectly understood through the specification may be provided.

Hereinabove, although the present disclosure has been described with reference to embodiments and the accompanying drawings, the present disclosure is not limited thereto, but may be variously modified and altered by those having ordinary skill in the art to which the present disclosure pertains without departing from the spirit and scope of the present disclosure claimed in the following claims.

What is claimed is:

1. An image processing apparatus of a vehicle comprising:
a storage configured to store optical property information of a first camera among a plurality of cameras for obtaining a vehicle periphery image;
a processor configured to determine whether backlight is present in the vehicle periphery image and to generate a display image based on whether the backlight is present; and
a communication device controlled by the processor and configured to communicate with a device in the vehicle,
wherein the processor is further configured to:
calculate location information of a light source for at least one of the first camera or the vehicle by using coordinates of a shadow object of the vehicle, which is recognized from the vehicle periphery image, and coordinates of the vehicle; and
determine whether the backlight is present, by comparing location information of the light source with the optical property information.

2. The image processing apparatus of claim 1, wherein the location information of the light source includes:
a first altitude corresponding to an altitude of the light source;
a first horizontal tilt angle formed between an optical axis of a second camera, which is positioned on a left side with respect to the light source, from among the plurality of cameras and the light source; and
a second horizontal tilt angle formed between an optical axis of a third camera, which is positioned on a right side with respect to the light source, from among the plurality of cameras and the light source.

3. The image processing apparatus of claim 2, wherein the optical property information includes:
a second altitude corresponding to a shooting range in an upward direction of the first camera with respect to an optical axis of the first camera;
a third horizontal tilt angle corresponding to a shooting range in a left direction of the first camera with respect to the optical axis of the first camera; and
a fourth horizontal tilt angle corresponding to a shooting range in a right direction of the first camera with respect to the optical axis of the first camera.

4. The image processing apparatus of claim 3, wherein the processor is further configured to:
determine whether the backlight is present, by using at least one comparison result of a first comparison result of comparing the first altitude and the second altitude, a second comparison result of comparing the first horizontal tilt angle and the third horizontal tilt angle, or a third comparison result of comparing the second horizontal tilt angle and the fourth horizontal tilt angle.

5. The image processing apparatus of claim 4, wherein the processor is further configured to:

determine that the backlight is present, when at least one of a first backlight existence condition that the first altitude is not greater than the second altitude, a second backlight existence condition that the first horizontal tilt angle is not less than the third horizontal tilt angle, or a third backlight existence condition that the second horizontal tilt angle is not greater than the fourth horizontal tilt angle is satisfied.

6. The image processing apparatus of claim 2, wherein the first altitude corresponds to an angle formed between a ground surface and an edge line of sight connecting a first edge point of the shadow object to a second edge point of the vehicle adjacent to the first edge point,
   wherein the first horizontal tilt angle is an angle between a first optical axis of the second camera, which is positioned on one side with respect to the second edge point, from among the plurality of cameras and a reference line obtained by projecting the edge line of sight onto the ground surface, and
   wherein the second horizontal tilt angle is an angle between a second optical axis of the third camera, which is positioned on the other side with respect to the second edge point, from among the plurality of cameras and the reference line obtained by projecting the edge line of sight onto the ground surface.

7. The image processing apparatus of claim 3, wherein the second altitude corresponds to an angle formed between the optical axis of the first camera facing a center part of a two-dimensional (2D) image view, which is captured through the first camera among the plurality of cameras, and a first line of sight connecting between a top pixel of the 2D image view and the first camera,
   wherein the third horizontal tilt angle is an angle formed between the optical axis of the first camera and a second line of sight connecting a leftmost pixel of the 2D image view to the camera, and
   wherein the fourth horizontal tilt angle is an angle formed between the optical axis of the first camera and a third line of sight connecting a rightmost pixel of the 2D image view to the first camera.

8. The image processing apparatus of claim 1, wherein the processor is further configured to:
   select a camera, which is positioned on an opposite side of the shadow object with respect to the vehicle, from among the plurality of cameras as a backlight determination camera; and
   compare the optical property information of the backlight determination camera with the location information of the light source.

9. The image processing apparatus of claim 1, wherein the processor is further configured to:
   determine consistency of the location information of the light source based on whether an outermost line of the shadow object matches a skin surface line of the vehicle.

10. The image processing apparatus of claim 1, wherein the processor is further configured to:
    determine whether a light bleed area is present in the vehicle periphery image when it is determined that the backlight is present in the vehicle periphery image; and
    generate the display image excluding the light bleed area in the vehicle periphery image when it is determined that the light bleed area is present.

11. The image processing apparatus of claim 10, wherein the processor is further configured to:
    determine whether the light bleed area is present, by determining continuity of pixels having a predetermined color value from a location of a light source object generating the backlight.

12. A vehicle image processing method, the method comprising:
    extracting coordinates of a shadow object of a vehicle based on information recognized from a vehicle periphery image obtained by using a plurality of cameras;
    calculating optical property information for a first camera of the plurality of cameras;
    calculating location information of a light source for at least one of the first camera or the vehicle by using coordinates of the shadow object and coordinates of the vehicle; and
    determining whether backlight is present in the vehicle periphery image, by comparing the optical property information and the location information of the light source.

13. The method of claim 12, wherein the calculating of the location information of the light source includes:
    calculating the location information of the light source for the vehicle including a first altitude corresponding to an altitude of the light source; and
    calculating the location information of the light source for a second camera or a third camera among the plurality of cameras, which includes a first horizontal tilt angle formed between an optical axis of a second camera, which is positioned on a left side with respect to the light source, from among the plurality of cameras and the light source and a second horizontal tilt angle formed between an optical axis of a third camera, which is positioned on a right side with respect to the light source, from among the plurality of cameras and the light source.

14. The method of claim 13, wherein the calculating of the optical property information includes:
    calculating a second altitude corresponding to a shooting range in an upward direction of the first camera with respect to an optical axis of the first camera;
    calculating a third horizontal tilt angle corresponding to a shooting range in a left direction of the first camera with respect to the optical axis of the first camera; and
    calculating a fourth horizontal tilt angle corresponding to a shooting range in a right direction of the first camera with respect to the optical axis of the first camera.

15. The method of claim 14, wherein the determining of whether the backlight is present includes:
    determining whether the backlight is present, by using at least one of a first comparison result of comparing the first altitude and the second altitude, a second comparison result of comparing the first horizontal tilt angle and the third horizontal tilt angle, or a third comparison result of comparing the second horizontal tilt angle and the fourth horizontal tilt angle.

16. The method of claim 14, wherein the determining of whether the backlight is present includes:
    determining that the backlight is present when at least one of a first backlight existence condition that the first altitude is not greater than the second altitude, a second backlight existence condition that the first horizontal tilt angle is not less than the third horizontal tilt angle, or a third backlight existence condition that the second horizontal tilt angle is not greater than the fourth horizontal tilt angle is satisfied.

17. The method of claim 12, further comprising:
selecting a camera, which is positioned on an opposite side of the shadow object with respect to the vehicle, from among the plurality of cameras as a backlight determination camera,
wherein the determining of whether the backlight is present includes:
comparing the optical property information of the backlight determination camera with the location information of the light source.

18. The method of claim 12, further comprising:
determining consistency of the location information of the light source based on whether an outermost line of the shadow object matches a skin surface line of the vehicle.

19. The method of claim 12, further comprising:
determining whether a light bleed area is present in the vehicle periphery image when it is determined that the backlight is present in the vehicle periphery image; and
generating the display image excluding the light bleed area in the vehicle periphery image when it is determined that the light bleed area is present.

20. The method of claim 19, wherein the determining of whether the light bleed area is present includes:
determining continuity of pixels having a predetermined color value from a location of a light source object generating the backlight.

* * * * *